(12) United States Patent
Goodrich et al.

(10) Patent No.: US 7,257,711 B2
(45) Date of Patent: Aug. 14, 2007

(54) EFFICIENT AUTHENTICATED DICTIONARIES WITH SKIP LISTS AND COMMUTATIVE HASHING

(75) Inventors: Michael T. Goodrich, Orange County, CA (US); Roberto Tamassia, Providence, RI (US)

(73) Assignees: The Johns Hopkins University, Baltimore, MD (US); Brown University, Providence, RI (US)

( * ) Notice: Subject to any disclaimer, the term of this patent is extended or adjusted under 35 U.S.C. 154(b) by 799 days.

(21) Appl. No.: 10/416,015

(22) PCT Filed: Nov. 8, 2001

(86) PCT No.: PCT/US01/43008

§ 371 (c)(1),
(2), (4) Date: May 7, 2003

(87) PCT Pub. No.: WO02/39659

PCT Pub. Date: May 16, 2002

(65) Prior Publication Data

US 2004/0107346 A1    Jun. 3, 2004

(51) Int. Cl.
*H04L 9/00* (2006.01)
*G06F 17/30* (2006.01)
(52) U.S. Cl. .......................................... 713/176; 707/2
(58) Field of Classification Search ............... None
See application file for complete search history.

(56) References Cited

U.S. PATENT DOCUMENTS 6,167,392 A  *  12/2000  Ostrovsky et al. ............. 707/2
6,208,993 B1 *  3/2001  Shadmon ..................... 707/102
6,226,383 B1     5/2001  Jablon

OTHER PUBLICATIONS

Pugh W., Skip lists: a probabilistic alternative to balanced trees, Communications of the ACM, Jun. 1990, 33(6) 668-676.*
Goodrich, et al., Implementations of an Authenticated Dictionary with Skip Lists and Commutative Hashing, 2001, accessed from http://www.cs.jhu.edu/~goodrich/cgc/pubs/discex2001.pdf.*

* cited by examiner

*Primary Examiner*—Nasser Moazzami
*Assistant Examiner*—Brandon Hoffman
(74) *Attorney, Agent, or Firm*—Whitham Curtis Christofferson & Cook, PC (57) ABSTRACT

An efficient and practical method for dynamically maintaining an authenticated dictionary uses a skip list data structure and communicative hash functions to provide a dictionary database (201) that stores information objects so that any individual object can be authenticated as belonging or not belonging to the dictionary. The authentication consists of a short sequence of vales that begin with an element and a sequence of values that, when hashed in order using a cryptographic associative hash function, create the same value as the hashed digest of the entire dictionary. Rather than hashing up a dynamic 2-3 tree, hashes are created in a skip list. Validation of the result of the authenticating step is provided if the hash of the short sequence matches a signed hash of the entire skip list.

7 Claims, 12 Drawing Sheets

EFFICIENT AUTHENTICATED DICTIONARIES WITH SKIP LISTS AND COMMUTATIVE HASHING

GOVERNMENT INTERESTS

The work leading to this invention was funded in part by the Defense Advanced Research Projects Agency (DARPA), grant number: F30602-00-0509. The U.S. Government may have certain rights in this invention.

DESCRIPTION

BACKGROUND OF THE INVENTION

1. Field of the Invention

The present invention relates to an efficient and practical technique for dynamically maintaining an authenticated dictionary. The main building blocks of the process are a skip list data structure and cryptographic associative hash functions. Applications of the invention include certificate revocation in public key infrastructure and the publication of data collections on the Internet. By making the dynamic maintenance of an accumulated dictionary more practical, computations can be performed on simple devices, such as personal digital assistants (PDAs), smart cards, or cellphones.

2. Background Description

The problem we address involves three parties: a trusted source, an untrusted directory, and a user. The source defines a finite set S of elements that evolves over time through insertions and deletions of elements. The directory maintains a copy of set S. It receives time-stamped updates from the source together with update authentication information, such as signed statements about the update and the current elements of the set. The user performs membership queries on the set S of the type "is element e in set S?", but instead of contacting the source directly, it queries the directory. The directory provides the user with a yes/no answer to the query together with query authentication information, which yields a proof of the answer assembled by combining statements signed by the source. The user then verifies the proof by relying solely on its trust in the source and the availability of public information about the source that allows checking the source's signature. The data structure used by the directory to maintain set S, together with the protocol for queries and updates is called an authenticated dictionary (see, for example, M. Naor and K. Nissim, "Certificate revocation and certificate update", *Proceedings of the 7th USENIX Security Symposium (SECURITY-98)*, pp. 217-228, Berkeley, 1998).

Figure 1:
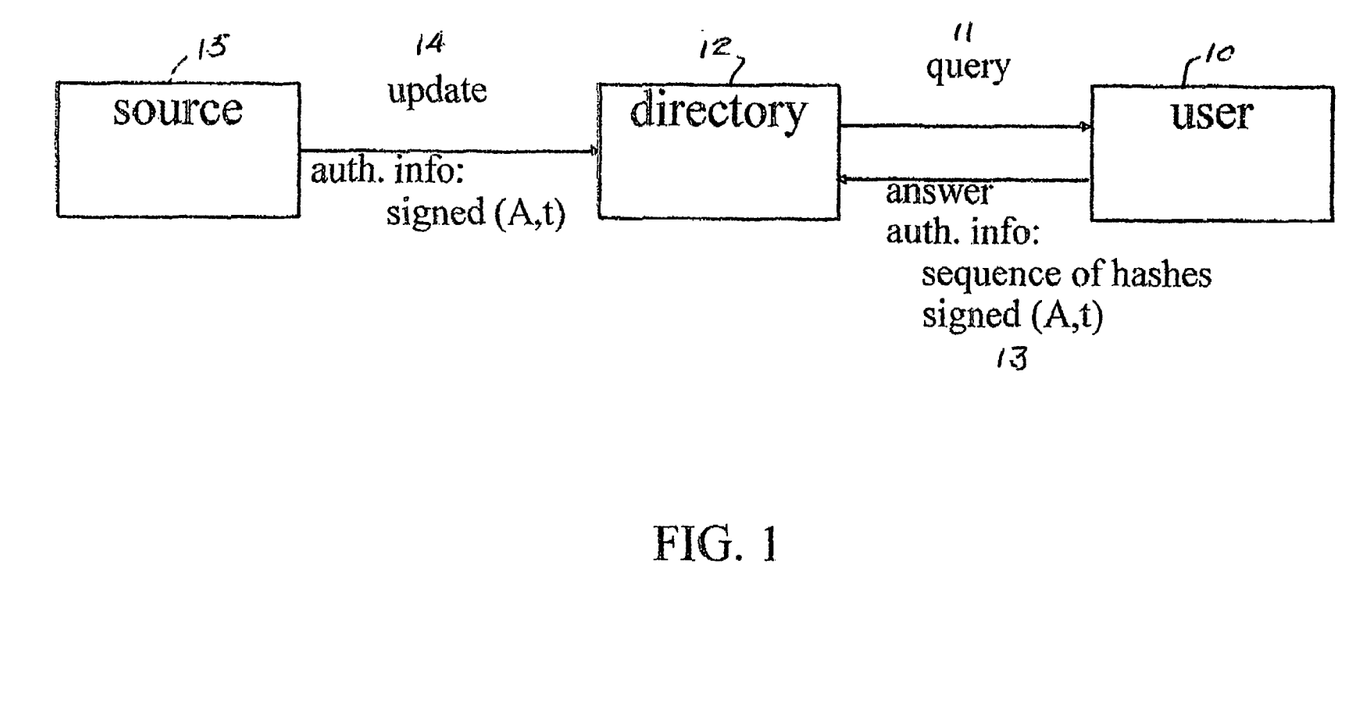
FIG. 1 is a schematic diagram of an authenticated dictionary showing data exchanged between the parties.

FIG. 1 shows a schematic view of an authenticated dictionary. In the use of the authenticated dictionary, a user 10 makes a query 11 to a directory 12 which responds by providing as its answer authentication information 13. The directory 12, in turn, is provided with update authentication information 14 from the source 15.

The design of an authenticated dictionary should address the following goals:

low computational cost: the computations performed internally by each entity (source, directory, and user) should be simple and fast; also, the memory space used by the data structures supporting the computation should be as small as possible;

low communication overhead: source-to-directory communication (update authentication information) and directory-to-user communication (query authentication information) should be kept as small as possible; and high security: the authenticity of the data provided by a directory should be verifiable with a high degree of reliability.

We can formalize the above goals as the algorithmic problem of minimizing the following cost parameters of an authenticated dictionary for set S:

1. space used by the data structure;
2. the time spent by the directory to perform an update initiated by the source;
3. size of the update authentication information sent by the source in an update (source-to-directory communication);
4. time spent by the directory to answer a query and return the query authentication information as a proof of the answer;
5. size of the query authentication information sent by the directory together with the answer (directory-to-user communication); and
6. time spent by the user to verify the answer to a query.

Authenticated dictionaries have a number of applications, including scientific data mining (e.g., genomic querying and astrophysical querying), geographic data sewers (e.g., GIS querying), third-party data publication on the Internet, and certificate revocation in public key infrastructure.

In the third-party publication application, the source is a trusted organization (e.g., a stock exchange) that produces and maintains integrity-critical content (e.g., stock prices) and allows third parties (e.g., Web portals), to publish this content on the Internet so that it widely disseminated. The publishers store copies of the content produced by The source and process queries on such content made by the users. In addition to returning the result of a query a publisher also returns a proof of authenticity of the result, thus providing a validation service. Publishers also perform content updates originating from the source. Even so, the publishers are not assumed to be trustworthy, for a given publisher may be processing updates from the source incorrectly or it may be the victim of a system break-in.

In the certificate revocation application, the source is a certification authority (CA) that digitally signs certificates binding entities to their public keys, thus guaranteeing their validity. Nevertheless, certificates are sometimes revoked (e.g., if a private key is lost or compromised, or if someone loses their authority to use a particular private key). Thus, the user of a certificate must be able to verify' that a given certificate has not been revoked. To facilitate such queries, the set of revoked certificates is distributed to certificate revocation directories, which process revocation status queries on behalf of users. The results of such queries need to be trustworthy, for they often form the basis for electronic commerce transactions.

SUMMARY OF THE INVENTION

It is therefore an object of the present invention to provide an efficient and practical authenticated dictionary which factors away many of the complications of previous schemes while maintaining their asymptotic performance properties.

It is another object of the invention to provide an authenticated dictionary that retains the basic security properties of previous schemes but makes the dynamic maintenance of the dictionary more practical, particularly for contexts where user computations must be performed on simple devices.

According to the invention, there is provided a new scheme for authenticated dictionaries, based on the skip list data structure and on commutative collision-resistant hash functions. Our data structure is efficient and secure. It matches the theoretical performance parameters of the best previous approaches that attempt to optimize simultaneously all The above performance measures. In addition, our algorithms are simpler to implement and deploy in practical applications. With our technique, the computations performed by the user are very simple and can be easily done on devices with limited memory and computing power, such as personal digital assistants (PDAs), smart cards, and cellphones.

The present invention is based on two new ideas. First, rather than hashing up a dynamic 2-3 tree, hashes are created in a skip list. This choice has two immediate benefits: (1) it replaces the complex details of 2-3 trees with easy-to-implement details of skip lists, and (2) it allows avoiding the complication of storing intervals at leaf nodes instead of storing actual items at the base nodes. Second, the invention introduces the use of commutative hashing as a means to greatly simplify the verification process for a user, while retaining the basic security properties of signing a collection of values via cryptographic hashing.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
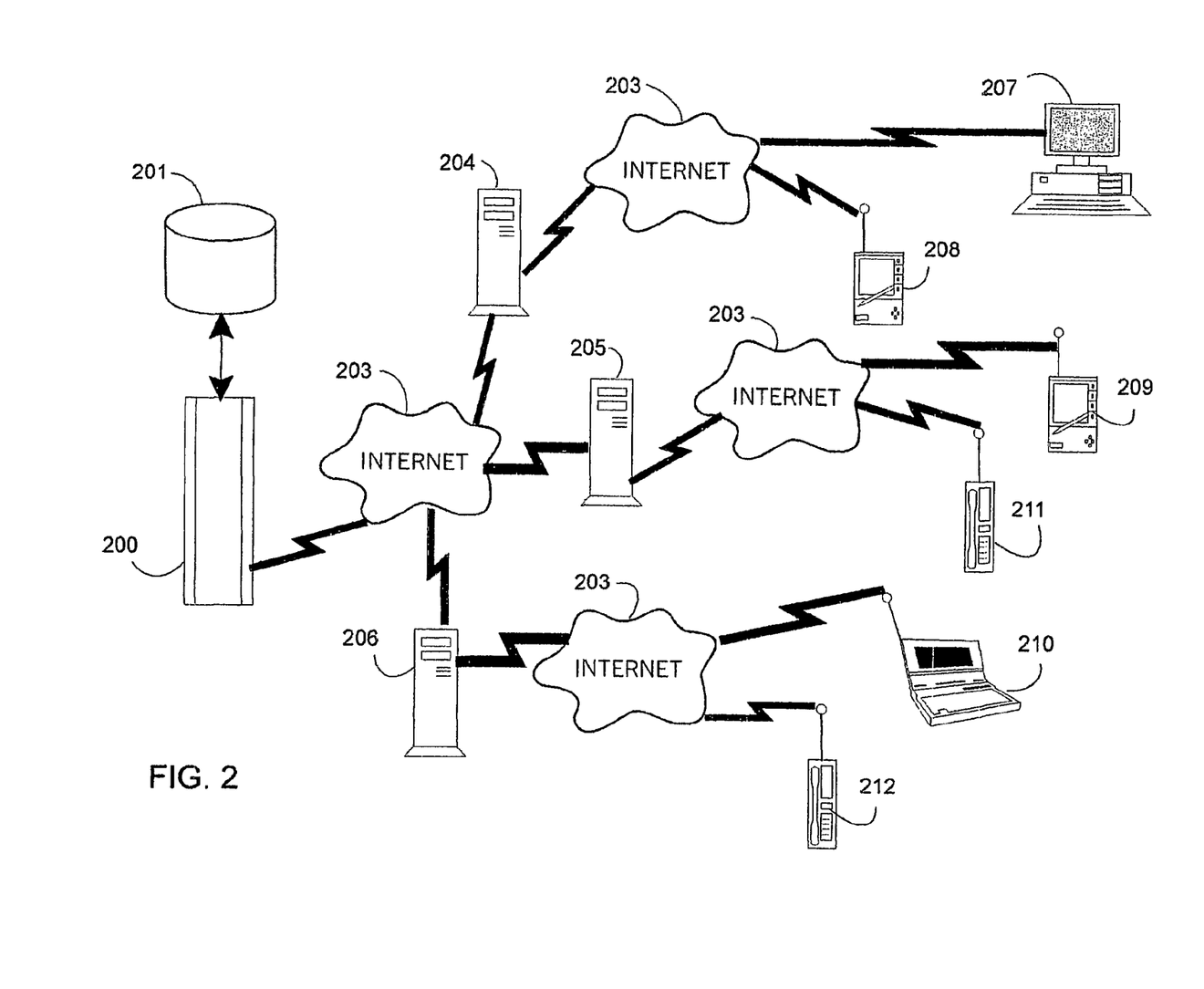
FIG. 2 is a block diagram showing a source computer interconnected to a plurality of directories which are accessed by a plurality of users.

Referring again to the drawings, and more particularly to FIG. 2, there is shown a block diagram of the environment in which the invention is practiced. A source computer 200 having a database 201 is connected via some network, such as the Internet 203, to a plurality of directories, here represented by computers 204, 205 and 206. The directories are, in turn, accessed by a plurality of user devices over a network, such as the Internet 203. These user devices may be desktop computers 207, personal digital assistants (PDAs) 208, 209, hand held computers 210, cellphones 211, 212, and other such devices, including smart cards and the like, having limited computing power. Many of these connections are wireless, requiring short responses from a directory that can be quickly verified with low computational overhead.

In the following description, we denote with n the current number of elements of the set S stored in the authenticated dictionary.

Previous work on authenticated dictionaries has been conducted primarily in the context of certificate revocation. The traditional method for certificate revocation (e.g., see C. Kaufman, R. Perlman, and M. Speciner, *Network Security: Private Communication in a Public World*, Prentice-Hall, Englewood Cliffs, N.J., 1995) is for the CA (source) to sign a statement consisting of a timestamp plus a hash of the list of all revoked certificates, called certificate revocation list (CRL), and periodically send the signed CRL to the directories. A directory then just forwards that entire signed CRL to any user who requests the revocation status of a certificate. This approach is secure, but it is inefficient, for it requires the transmission of the entire set of revoked certificates for both source-to-directory and directory-to-user communication.

The CRL scheme corresponds to an authenticated dictionary where both the update authentication information and the query authentication information has size $O(n)$. The amount of data sent by the source to the directory can be reduced to $O(1)$ by using a modification of the CRL scheme: at each time period, the source transmits to the directory the update operation performed (an insertion or removal) plus the signed timestamped hash of the current set. The directory reconstructs then the new set so that it can send it to the user Even with this improvement, the query time, query authentication information, and the verification time remain $O(n)$. Thus, the CRL scheme does not yield an efficient authenticated dictionary.

An alternative simplistic scheme is related to the online certificate status protocol (OCSP) (see M. Myers, R. Ankney, A. Malpani, S. Galperin, and C. Adams, RFC 2560, X.509 Internet public key infrastructure online certificate status protocol—OCSP, 1999). The source maintains the set S sorted, and at each time period, sends to the directory a collection of n+1 signed timestamped pairs of elements of S, where a pair (x, y) indicates that (i) element x is in S, and (ii) there are no elements of S in the open interval (x, y). The directory then replies to a query by simply forwarding to the user the appropriate signed timestamped pairs. With this scheme, the query time, verification time, and query authentication information size, are $O(1)$ but the update time and update authentication size are $O(n)$. We call this scheme the OCSP scheme, although it should be noted that the actual OCSP protocol differs significantly from the above scheme in that the directory signs the answer to a query.

The hash tree scheme introduced by R. C. Merkle (see "Protocols for public key cryptosystems", *Proc. Symp. On Security and Privacy*, IEEE Computer Society Press, 1980, and "A certified digital signature" in *Advances in Cryptology—CRYPTO '89*, G. Brassard, editor vol. 435, lecture Notes in Computer Science, pp. 218-238, Springer-Verlag, 1990) can be used to implement a static authenticated dictionary, which supports the initial construction of the data structure followed by query operations, but not update operations (without complete rebuilding). A hash tree T for a set S stores the elements of S at the leaves of T and a hash value $f(v)$ at each node v, defined as follows:

if v is a leaf, $f(v)=h(x)$, where x is the element stored at x and h is a collision-resistant cryptographic hash function;

else (v is an internal node), $f(v)=h(f(u),f(w))$, where u and w are the left and right child of v, respectively.

The authenticated dictionary for S consists of the hash tree T plus the signature of a statement consisting of a timestamp and the value $f(r)$ stored at the root r of T. An element x is proven to belong to S by reporting the sequence of values stored at the siblings of the nodes on the path from the node storing x to the root. Each of these values must be identified as being stored at a left or a right child node, so that the user can correctly recompute the root's hash value and compare it to the current signed value. It is important that all this order and connectivity information be presented to the user, for without it the user would have great difficulty recomputing the hash value for the root. This hash tree scheme can be extended to validate that an item x is not in S by keeping the leaves of T sorted and then returning the leaf-to-root paths, and associated hash values, for two elements y and z such that y and z are stored at consecutive leaves of T and y<x<z, or (in the boundary cases) y is undefined and z is the left-most leaf or z is undefined and y is the right-most leaf. Again, the user is required to know enough about binary trees to be able to verity from the topology of the two paths that y and z are stored at consecutive leaves.

P. C. Kocher in "On certificate revocation and validation", *Proc. International Conference on Financial Cryptography*, vol. 1465 of *Lecture Notes in Computer Science,* 1998, also advocates a static hash tree approach for realizing an authenticated dictionary, but simplifies somewhat the processing done by the user to validate that an item is not in the set S. In his solution, the leaves of the hash tree store the intervals defined by the consecutive elements in the sorted sequence of the elements of S. A membership query for an item x always returns a leaf v and and the interval [y, z] stored at v such that $y \leq x<z$, together with the path from v to the root and all sibling hash values for nodes along this path. The user validates this path by re-computing the hash values of the nodes in this path, keeping track of whether nodes are left children or right children of their respective parents. Although there is a minor extra overhead of now having to have a way of representing $-\infty$ and $+\infty$, this method simplifies the verification for the case when an item is not in S (which will usually be the case in certificate revocation applications). It does not support updates of the set S, however.

Using techniques from incremental cryptography, M. Naor and K. Nissim (see "Certificate revocation and certificate update", *Proceedings of the 7$^{th}$ USENIX Security Symposium (Security*-98), pp. 217-228, Berkeley, 1998) dynamize hash trees to support the insertion and deletion of elements. In their scheme, the source and the directory maintain identically-implemented 2-3 trees. Each leaf of such a 2-3 tree T stores an element of set S, and each internal node stores a one-way hash of its children's values. Hence, the source-to-directory communication is reduced to O(1) items, since the source sends insert and remove instructions to the directory, together with a signed message consisting of a timestamp and the hash value of the root of T. A directory responds to a membership query for an element x as follows: if x is in S, then the directory supplies the path of T from the leaf storing x to the root together with all the siblings of the nodes on this path; else (x is not in S), the directory supplies the leaf-to-root paths from two consecutive leaves storing y and z such that y<x<z, together with all siblings of the nodes on these paths. By tracing these paths, the user can recompute the hash values of their nodes, ultimately recomputing the hash value for the root which is then compared against the signed hash value of the root for authentication. One can apply Kocher's interval idea to this scheme as an alternative way of validating items that are not in the dictionary S. There are nevertheless some drawbacks of this approach. Dynamic 2-3 frees are not trivial to program correctly, as it is. In addition, since nodes in a 2-3 tree can have two or three children, one must take special care in the structuring of the query authentication information sent by the directory to the user Namely, all sibling nodes returned must be classified as being left children, middle children (if they exist), or right children. Re-computing the hash value at the root requires that a user be able to match the computation done at the source as regards a particular leaf-to-root path.

Other certificate revocation schemes based on variations of hash trees have been recently proposed, as well, but do not deviate significantly from the above approaches.

S. Micali in "Efficient certificate revocation", Technical Report TM-542b, MIT Laboratory for Computer Science, 1996, proposes an alternate approach, where the source periodically sends to each directory the list of all issued certificates, each tagged with the signed time-stamped value of a one-way hash function that indicates if this certificate has been revoked or not. This approach allows the system to reduce the size of the query authentication information to O(1) words: namely just a certificate identifier and a hash value indicating its status. Unfortunately, this scheme requires the size of the update authentication information to increase to O(N), where N is the number of all nonexpired certificates issued by the certifying authority, which is typically much larger than the number n of revoked certificates.

We introduce an efficient and practical authenticated dictionary scheme, which factors away many of the complications of the previous schemes while maintaining their asymptotic performance properties. Our approach is based on two new ideas. First, rather than hashing up a dynamic 2-3 tree, we hash in a skip list (see W. Pugh, "Skip lists: a probabilistic alternative to balanced trees, *Commun. ACM,* 33(6):668-676, 1990). This choice has two immediate benefits:

It replaces the complex details of 2-3 frees with the easy-to-implement details of skip lists.

It allows us to avoid the complication of storing intervals at leaf nodes, and instead allows us to return to the intuitive concept of storing actual items at the base nodes.

Second, we introduce the use of commutative hashing as a means to greatly simplify the verification process for a user, while retaining the basic security properties of signing a collection of values via cryptographic hashing. We summarize the asymptotic performance of our scheme in Table 1. Our methods therefore match the asymptotic performance of the Naor-Nissim approach, supra, while simplifying the details of an actual implementation of a dynamic authenticated dictionary. Indeed, we show that the verification process for a user can now be simplified to a straightforward iterative hashing of a sequence of numbers, with no regards to notions such as leaf-to-root paths or left, middle, or right children. If the hash of this sequence matches the signed hash of the entire skip list, then the result (either a membership or its converse) is validated.

TABLE 1

Comparison of the main authenticated dictionary schemes with the present invention.

| method | space | update time | update info | query time | query info | verify time |
|---|---|---|---|---|---|---|
| CRL scheme | O(n) | O(1) | O(1) | O(n) | O(n) | O(n) |
| OCSP scheme | O(n) | O(n) | O(n) | O(1) | O(1) | O(1) |
| Micali | O(N) | O(N) | O(N) | O(1) | O(1) | O(t) |
| Naor-Nissim | O(n) | O(logn) | O(n) | O(logn) | O(logn) | O(logn) |
| present invention | O(n) | O(logn) | O(n) | O(logn) | O(logn) | O(logn) |

In Table 1, we use n to denote the size of the dictionary, t to denote the number of updates since a queried element has been created, and N to denote the size of the universe from which the elements of the dictionary are taken. The time and information size bounds for our information are expected with high probability, while they are worst-case for the other schemes.

Our update info size is actually about log n bits, which we can encode in a single word (since log n bits is needed just to store the value of n). We provide the details of our method in the description that follows. We begin by reviewing the skip list data structure and how it can be used to maintain a dictionary of elements subject to insertions, deletions, and searches. We also describe an implementation of our approach in Java, and some promising benchmarking data on its performance.

Skip Lists

The skip list data structure (as described by W. Pugh, supra) is an efficient means for storing a set S of elements from an ordered universe. It supports the following operations:

find(x): determine whether elements x is in S.
insert(x): insert element x into S.
delete(x): remove element x from S.

A skip list stores a set S of elements in a series of linked lists $S_0, S_1, S_2, \ldots, S_t$. The base list, $S_0$, stores all the elements of S in order, as well as sentinels associated with the special elements $-\infty$ and $+\infty$. Each successive list $S_i$ for $i \geq 1$ stores a sample of the elements from $S_{i-1}$. The method used to define the sample from one level to the next determines the kind of skip list being maintained. The default method is simply to choose each element of $S_{i-1}$ at random with probability ½ to be in the list $S_i$. But one can also define a deterministic skip list which uses simple rules to guarantee that between any two elements in $S_i$ there are at least 1 and at most 3 elements of $S_{i-1}$. In either case, the sentinel elements $-\infty$ and $+\infty$ are always included in the next level up, and the top level, t, is maintained to be O(log n). In both the deterministic and the randomized versions, the top level is guaranteed to contain only the sentinels. We therefore distinguish the node of the top list St storing $-\infty$ as the start node s.

A node of $S_{i-1}$ storing an element that does not exist in S, is said to be a plateau node. A node that is not a plateau node is said to be a tower node. Thus, between any two tower nodes of the same list there are some plateau nodes. In deterministic skip lists, the number of plateau nodes between two tower nodes is at least one and at most three. In randomized skip lists, the expected number of plateau nodes between two tower nodes is one.

Figure 3:
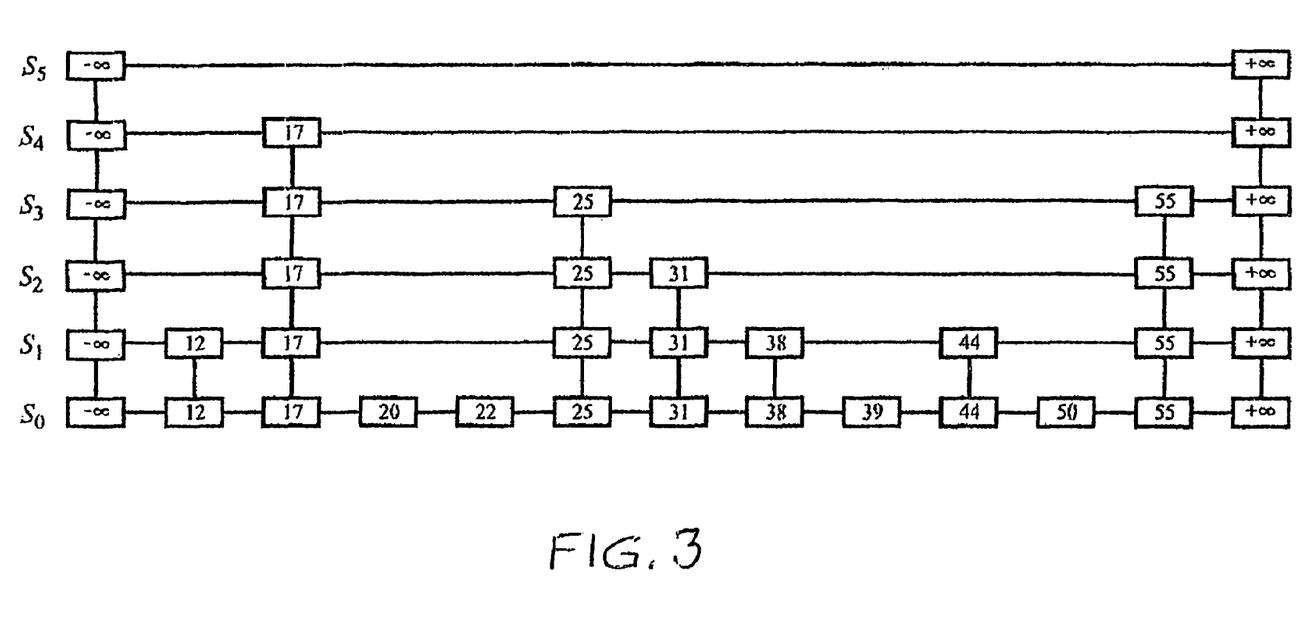
FIG. 3 is a data diagram illustrating an example of a skip list.

FIG. 3 shows an example of a skip list. For each node v of list $S_i$, we denote with elem(v) the element stored at v. Also, we denote with down(v) the node in $S_{i-1}$ below v, which stores the same element as v, unless i=0, in which case down(v)=null. Similarly, we denote with right(v) the node in $S_i$ immediately to the right of v, unless v is the sentinel storing $+\infty$, in which case right(v)=null.

To perform a search for element x in a skip list, we begin at the start node s. Let v denote the current node in our search (initially, v=s). The search proceeds using two actions, hop forward and drop down, which are repeated one after the other until we terminate the search.

Hop forward: We move right along the current list until we find the node of the current list with largest element less than or equal to x. That is, while elem(right(v))<x, we update v←right(v).

Drop down: If down(v)=null, then we are done with our search: The node v stores the largest element in the skip list less than or equal to x. Otherwise, we update v←down(v).

The outer loop of the search process continues while down (p)≠null, performing inside the loop one hop forward followed by one drop down. After completing such a sequence of hops forward and drops down, we ultimately reach a node v with down(v)=null. If, at this point, elem(v)=x, then we have found element x. Otherwise, v is the node of the base list with the largest element less than x; likewise, in this case, right(v) is the a node of the base list with the smallest element greater than x, that is, elem(v)<x<elem(right(v)).

Figure 4:
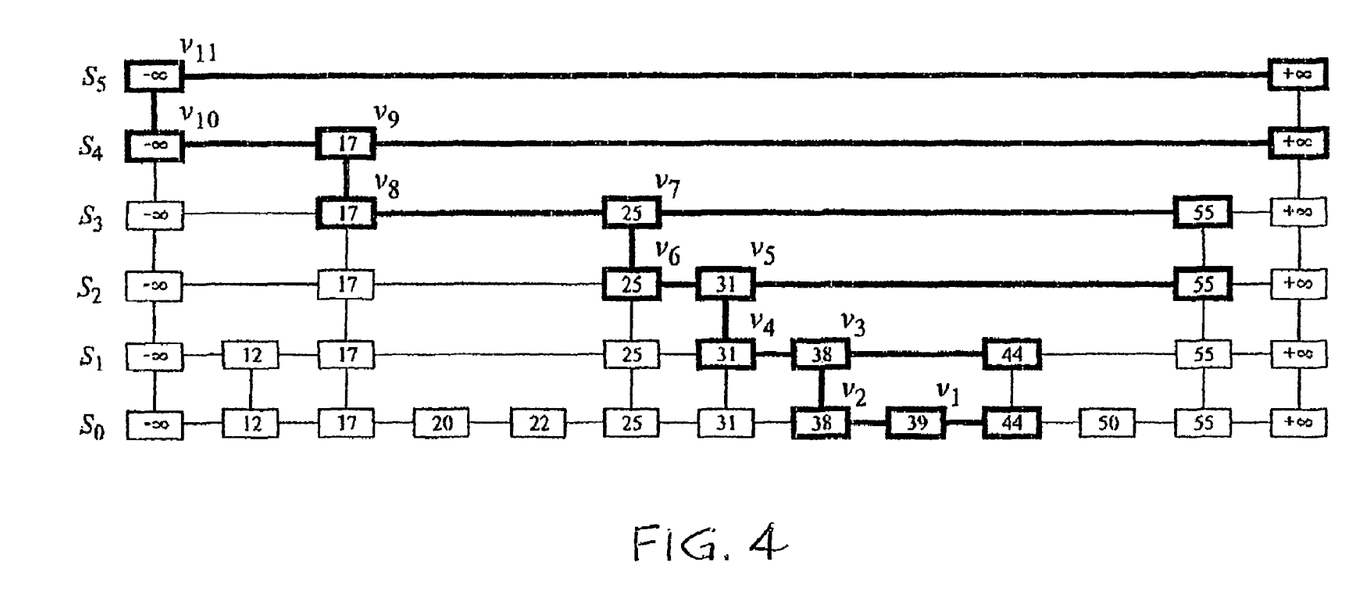
FIG. 4 is a data diagram illustrating a search for element 39 in the skip list of FIG. 3.
Figure 5:
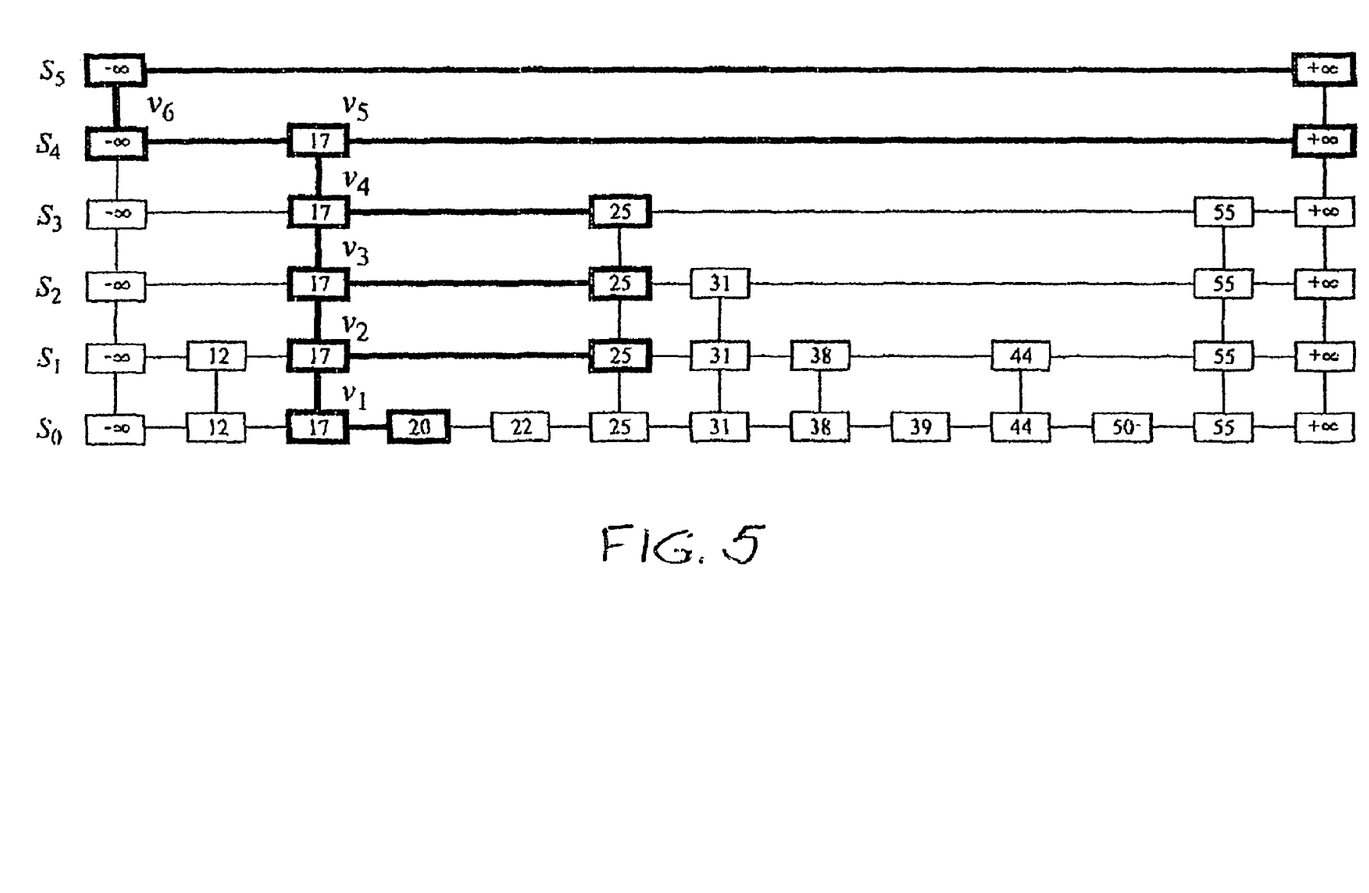
FIG. 5 is a data diagram illustrating a search for element 17 in the skip list of FIG. 3.

The process is illustrated in FIGS. 4 and 5. FIG. 4 illustrates a search for element 39 in the skip list shown in FIG. 3. The nodes visited and the links traversed are drawn with thick lines. This successful search visits the same nodes as the unsuccessful search for element 42. FIG. 5 illustrates a search for element 17 in the skip list shown in FIG. 3. Again, the nodes visited and the links traversed are drawn with thick lines. This successful search visits the same nodes as the unsuccessful search for element 18.

In a deterministic skip list, the above searching process is guaranteed to take O(log n) time. Even in a randomized skip list, it is fairly straightforward to show that the above searching process runs in expected O(log n) time, for, with high probability, the height t of the randomized skip list is O(log n) and the expected number of nodes visited on any level is three. Moreover, experimental studies have shown that randomized skip lists outperform in practice 2-3 trees, red-black frees, and other deterministic search free structures. Performing updates in a skip list is also quite simple.

To insert a new element x, we begin, as we would in a search, at the start node s. Indeed, we proceed by performing a search for element x. In addition, each time we perform a hop forward or drop down from the current node v, we push a reference to v in a stack, A, indicating if this was a hop forward or a drop down. Once the search stops at a node v of the base level $S_0$, we insert a new node into $S_0$ right after v and store there the element x. In a deterministic skip list we then use the stack A (with pop operations) to update the skip list as necessary to maintain the size rules for plateau nodes between towers. In a randomized skip list, we determine which lists should contain the new element x by a sequence of simulated random coin flips. Starting with i=0, while the coin comes up heads, we use the stack A to trace our way back to the position of list $S_{i+1}$ where element x should go, add a new node storing x to this list, and set i=i+1. We continue this insertion process until the coin comes up tails. If we reach the top level with this insertion process, we add a new top level on top of the current one. The time taken by the above insertion method is O(log n), worst-case for a deterministic skip list, and with high probability for a randomized skip list.

To delete an existing element x, we begin by performing a search for a fictitious element smaller than x but larger than any element of S less than x. As in the insertion case, we use a stack A to keep track of the nodes encountered during the search. The search ends at a node v on the bottom level such that elem(right(v))=x. (If this is not the case, then there is no element x in the skip list and we should signal an error.) We remove right(v) from the base level and, using the stack A, we remove all the nodes on higher levels that contain the element x. The time taken by the above removal method is O(log n), worst-case for a deterministic skip list, and with high probability for a randomized skip list.

Commutative Hashing

In the practice of our invention, we view a cryptographic hash function as a function that takes two integer arguments, x and y, with the same number of bits and maps them to an integer h(x, y) that is represented using a fixed number k of bits (typically fewer than the number of bits of x and y). Intuitively, h(x, y) is a digest for the pair (x, y). We can also use the hash function h to digest a triple, (x, y, z), as h(x, h(y, z)). Likewise, we can use h to digest larger sequences. Namely, to digest a sequence $(x_1, x_2, \ldots, x_m,)$ we can compute $h(x_1, h(x_2, \ldots, h(x_{m-2}, h(x_{m-1}, x_m)) \ldots ))$.

The reason that cryptographic hash functions are useful for the task of authenticating dictionary responses is that given a pair (a, b) it is difficult to find a pair (c, d)≠(a, b) such that h(a, b)=h(c, d). The concept of difficulty here is that it is computationally intractable to find such a pair (c, d) independent of the specific values for a and b. The value T, of time steps needed to compute such a colliding pair, should depend only on the number of bits in the hash value for h's range, and T should be so large as to be an infeasible computation for even a supercomputer to perform. This property of h is known as collision resistance.

To simplify the verification process that a user has to do in our authenticated dictionary invention, we would like a cryptographic hash function that has an additional property. We want a hash function h that is commutative, that is, h(x, y)=h(y, x), for all x and y. Such a function will allow us to simplify verification, but it requires that we modify what we mean by a collision resistant hash function, for the condition h(x, y)=h(y, x) would normally be considered as a collision. We therefore say that a hash function is commutatively collision resistant if, given (a, b), it is difficult to compute a pair (c, d) such that h(a, b)=h(c, a) while (a, b)≠(c, d) and (a, b)≠(d, c).

Given a cryptographic hash function $f$ that is collision resistant in the usual sense, we construct a candidate commutative cryptographic hash function, h, as follows:

$$h(x,y) = f(\min\{x,y\}, \max\{x,y\}).$$

This function is clearly commutative.

Its collision resistance derives from the collision resistance of $f$.

Specifically, given (a, b), consider the computational difficulty of finding a pair (c, d) such that h(a, b)=h(c, d) while (a, b)≠(c, d) and (a, b)≠(d, c). Without loss of generality, let us assume that a<b. If finding a collision pair (c, a) is computationally feasible for h, then this immediately implies (by a simple reduction) that it is computationally feasible to find numbers c and d such that $f$(a, b)=$f$(c, d) and (a, b)≠(c, a) or $f$(a, b)=$f$(d, c) and (a, b)≠(d, c). In either case we would have a collision in the usual cryptographic sense. Thus, if $f$ is collision resistant in the usual sense, then h is commutatively collision resistant.

We next show how to use a commutative cryptographic hash function to accumulate efficiently the values of a dictionary that are stored in a skip list.

Authenticated Dictionary Based on a Skip List

Let h be a commutative cryptographic hash function. Our authenticated dictionary for a set S consists of the following components:
A skip list data structure storing the items of S.
A collection of values $f$(v) that label each node v of the skip list, computed accumulating the elements of S with the hash function h, as discussed below.
A statement signed by the source consisting of the timestamp of the most recent label $f$(s) of the start node of the skip list.

We use h to compute the label $f$(v) of each node v in the skip list, except for the nodes associated with the sentinel value +∞. The value $f$(s) stored at the start node, s, represents a digest of the entire skip list. Intuitively, each label $f$(v) accumulates the labels of nodes below v possibly combined with the labels of some nodes to the right of v.

For each node v we define label $f$(v) in terms of the respective values at nodes w=right(v) and u=down(v). If right(v)=null, then we define $f$(v)=0. The definition of $f$(v) in the general case depends on whether u exists or not for this node v.
1. u=null, i.e., v is on the base level:
   (a) If w is a tower node, then $f$(v)=h(h(elem(v)), h(elem(w))).
   (b) If w is a plateau node, then $f$(v)=h(h(elem(v)),$f$(w)).
2. u≠null, i.e., v is not on the base level:
   (a) If w is a tower node, then $f$(v)=$f$(u).
   (b) If w is a plateau node, then $f$(v)=h($f$(u),$f$(w)).

Figure 6:
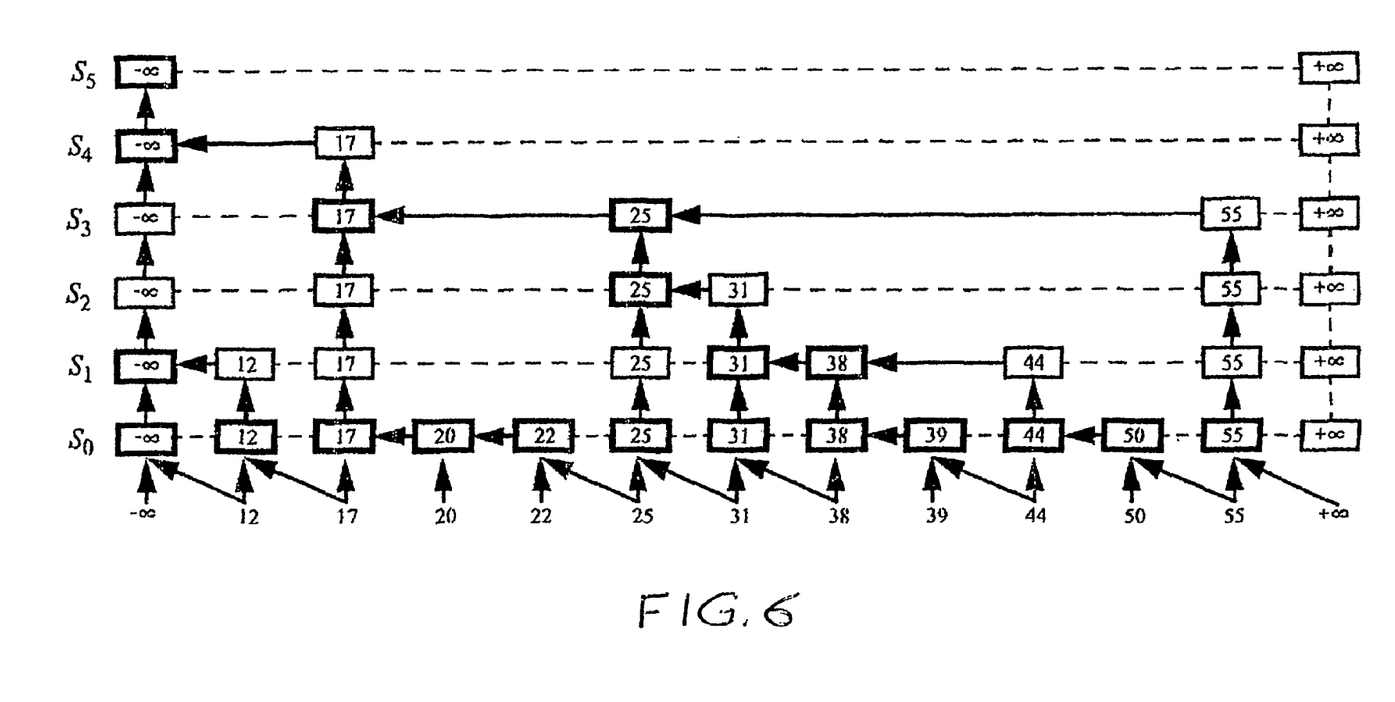
FIG. 6 is a data diagram illustrating the flow of the computation of the hash values labeling the nodes of the skip list of FIG. 3.

We illustrate the flow of the computation of the hash values labeling the nodes of a skip list in FIG. 6. Nodes where hash functions are computed are drawn with black lines. The arrows denote the flow of information, not pointer values in the data structure. Note that the computation flow defines a directed acyclic graph, not a tree.

The source maintains its own copy of the authenticated dictionary, and updates the authenticated dictionary of the directory by specifying the operation performed (insertion/deletion) and the element x involved, plus the following authentication information:
a signed statement consisting of a timestamp and the new hash value of the start node s;
if the skip list is randomized, the random bits used by the source in the update, which are O(log n) with high probability.

After performing the update in the skip list, the hash values must be updated to reflect the change that has occurred. In either an insertion or deletion, the stack A comes to our aid, to make the updating simple. For the nodes stored in the stack A (and possibly their right neighbors) are precisely the nodes whose hash values have changed. Thus, we can simple pop off nodes from the stack A and recompute the $f(v)$ labels for each one (plus possibly the $f$ labels for v's right neighbor, if that node stores the element that is being inserted or deleted, as the case maybe). The additional computational expense needed to update all these values is proportional to the number of elements in A; hence, it is expected with high probability to be O(log n) in a randomized skip list and is guaranteed to be O(log n) in a deterministic skip list.

The verification of the answer to a query is simple, thanks to the use of a commutative hash function. Recall that the goal is to produce a verification that some element x is or is not contained in the skip list. In the case when the answer is "yes," we verify the presence of the element itself. Otherwise, we verify the presence of two elements x' and x" stored at consecutive nodes on the bottom level $S_0$ such that x'<x<x". In either case, the query authentication information is a single sequence of values, together with the signed timestamp and value $f(s)$.

Let $P(x)=(v_1, \ldots, v_m)$ be the sequence of nodes that are visited when searching for element x, in reverse order. In the example of FIG. 3, we have $P(39)=P(42)=(v_1, \ldots, v_{11})$, and in the example of FIG. 4, we have $P(17)=P(18)=(v_1, \ldots, v_7)$. Note that by the properties of a skip list, the size in of sequence P(x) is O(log n) with high probability. We construct from the node sequence P(x) a sequence $Q(x)=(x_0, \ldots, x_p)$ of values using the method given in the following pseudocode:

```
w₁ ← right(v₁)
if w₁ is a plateau node then
    x₀ ← f(w₁)
else
    x₀ ← h(elem(w₁))
end if
x₁ ← x
j ← 1
for i ← 2, ..., m-1 do
    wᵢ ← right(vᵢ)
    if wᵢ is a plateau node then
        j ← j+1
        if wᵢ ≠ vᵢ₋₁ then
            xⱼ ← f(wᵢ)
        else
            if vᵢ is in the base list S₀ then
                xⱼ ← h(elem(vᵢ))
            else
                uᵢ ← down(vᵢ)
                xⱼ ← f(uᵢ)
            end if
        end if
    end if
end for
p ← j
```

The computation of the sequence P(x) can be easily done by pushing into a stack the nodes visited while searching for element x. When the search ends, the stack contains the nodes of P(x) ordered from top to bottom. Using this stack, we can construct sequence P(x) by following the method of FIG. 6, where the nodes of P(x) are obtained by popping them from the stack, one at a time.

We recall from the discussion above that node $v_1$ stores either x (for a "yes" answer) or the largest element less than x (for a "no" answer). In the first case ($v_1$ stores x), the directory returns as part of the authentication information for the membership of x in S the sequence P(x), as illustrated in FIGS. 7 and 8.

Figure 7:
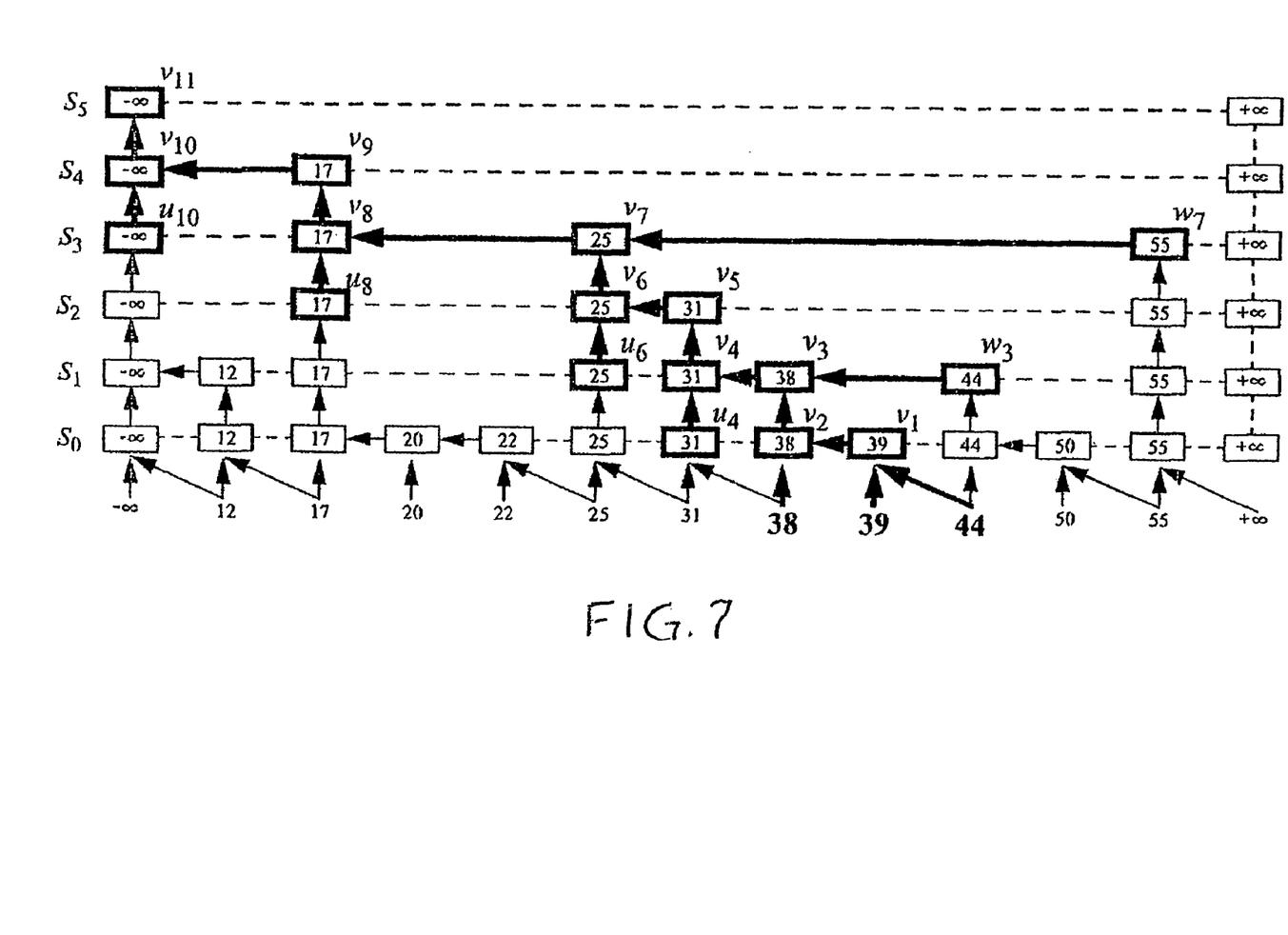
FIG. 7 is a data diagram illustrating the query authentication for the presence of element 39 (and for the absence of element 42)

More particularly, in FIG. 7, the query authentication information for the presence of element 39 (and for the absence of element 42) consists of the signed time-stamped value $f(v_{11})$ of the source element and the sequence (h(44), h(39), h(38),$f(w_3)$,$f(u_4)$,$f(u_6)$, $f(w_7)$,$f(u_8)$,$f(u_4)$, $f(u_{10})$). The user computes $f(v_{11})$ by accumulating the elements of the sequence with the hash function h, and verifies that the computed value of $f(v_7)$ is equal to the value signed by the source. Note that, as in FIG. 6, the arrows denote the flow of information, not pointer values in the data structure.

Figure 8:
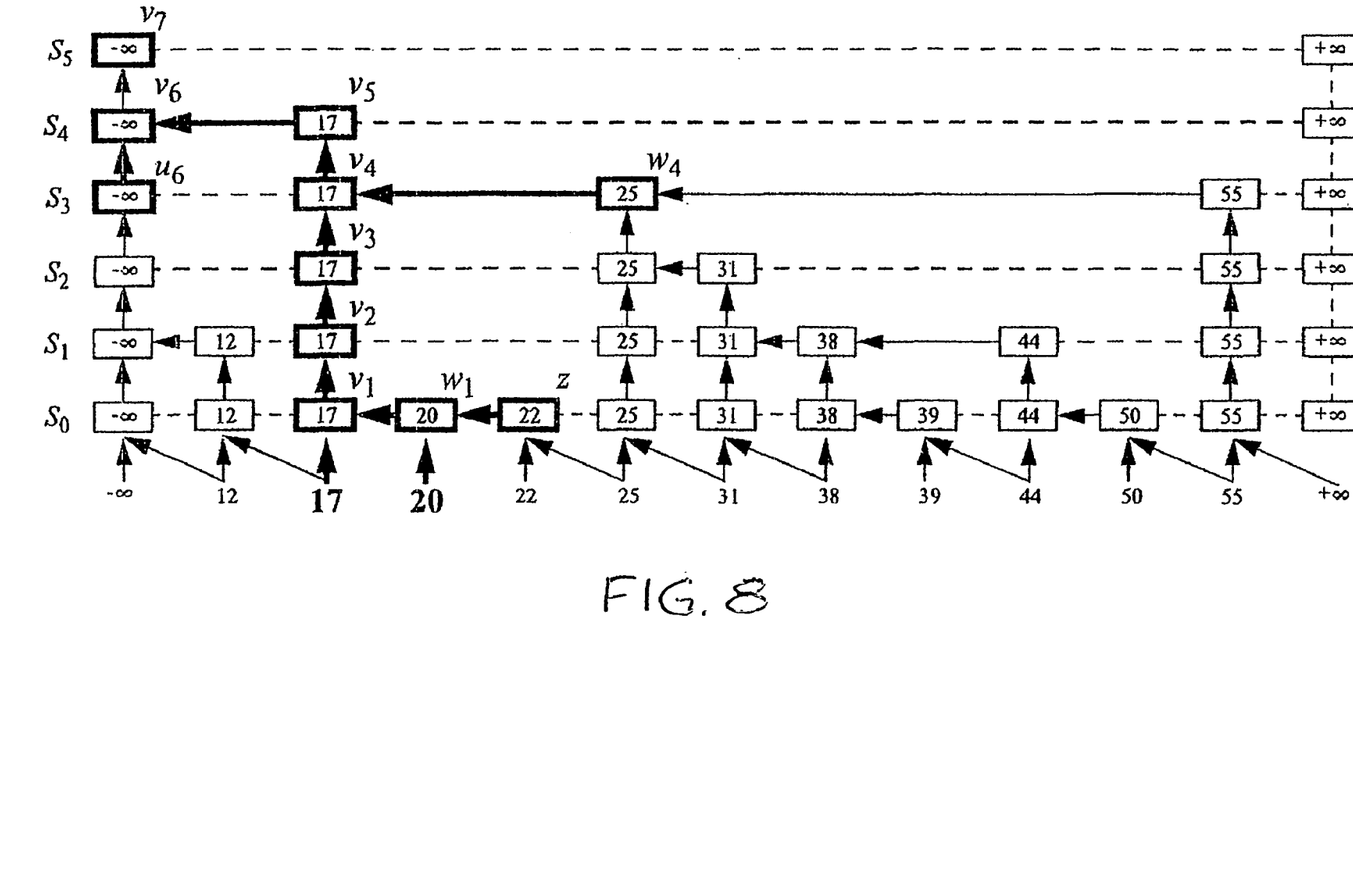
FIG. 8 is a data diagram illustrating the query authentication for the absence of element 18.

In FIG. 8, the query authentication information for the absence of element 18 consists of the signed time-stamped value $f(v_7)$ of the source element, and the sequence: Y=($f(z)$, h(20), h(17),$f(w_4)$,$f(u_6)$). The user re-computes $f(v_7)$ by accumulating the elements of sequence Y with the hash function h, and verifies that the computed value of $f(v-y)$ is equal to the value signed by the source. Please note that, as in FIG. 6, the arrows denote the flow of information, not pointer values in the data structure.

In the second case ($v_1$ does not store x), let $w_1$ be the node to the right of $v_1$, and z be the node to the right of $w_1$, if any; we further distinguish three subcases:

1. $w_1$ is a tower node: sequence Q(x) is returned, as illustrated in FIG. 7;
2. $w_1$ is a plateau node and $z_1$ is a tower node: the sequence (h(elem(z)), h(elem($w_1$)))·Q(x) is returned, where · denotes concatenation;
3. $w_1$ is a plateau node and $z_1$ is a plateau node: the sequence ($f(z)$, h(elem($w_1$))·Q(x) is returned, as illustrated in FIG. 8.

In either case, the main step in the verification of the answer by the user is a chain of hashes, where the values of the returned sequence are hashed in the given order. The result of the hash chain is then compared with the signed value $f(s)$, where s is the start node of the skip list. If the two values agree, then the user is assured of the validity of the answer at the time given by the timestamp.

Note that our invention requires only the repeated accumulation of a sequence of values with a hash function. Unlike the previous best hash tree schemes, there is no need to provide auxiliary information about the order of the arguments to be hashed at each step, as determined by the topology of the path in a hash tree.

Figure 9:
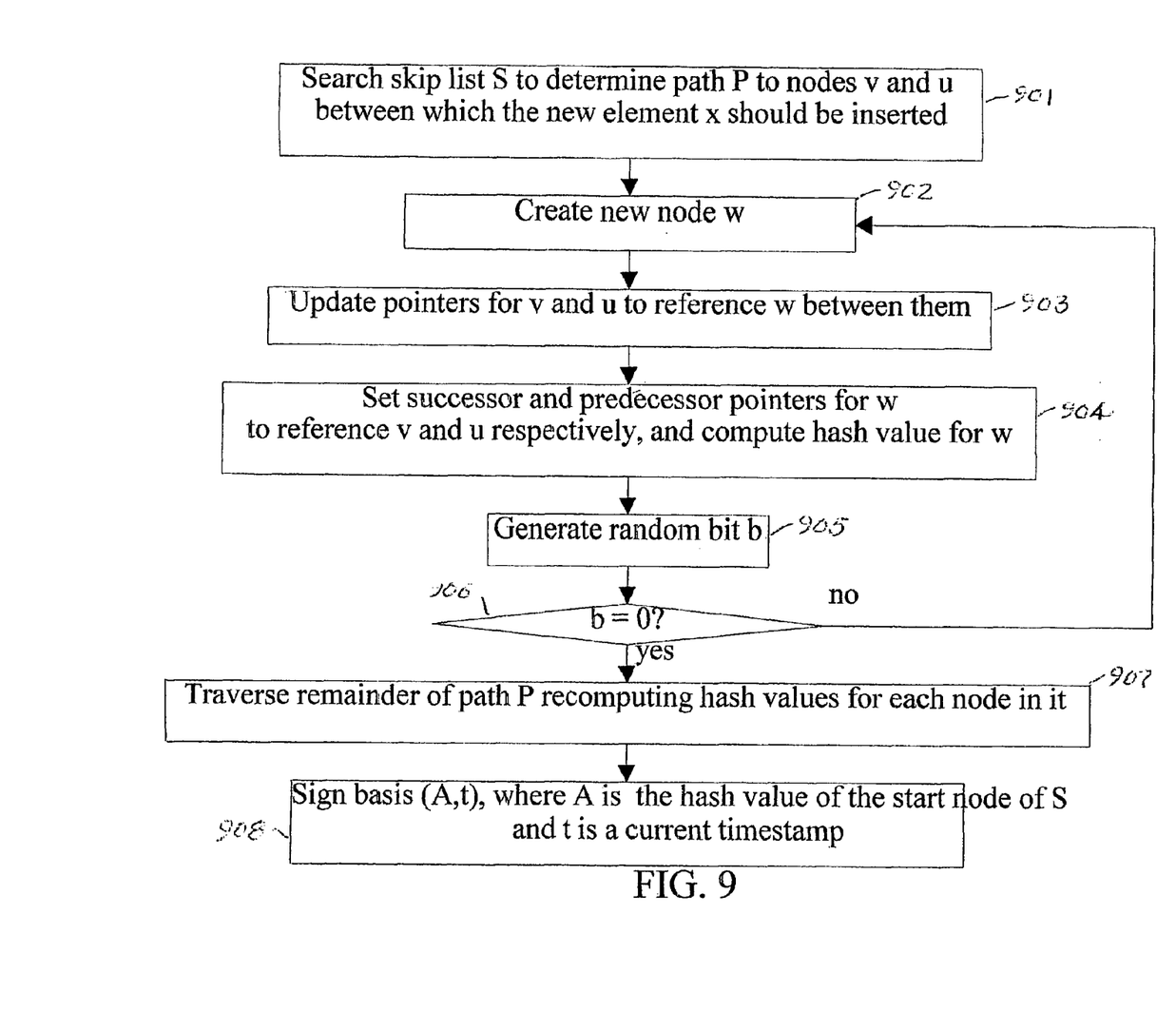
FIG. 9 is a flow diagram showing the logic of the update algorithm executed by the source computer.

FIG. 9 shows the logic of the update algorithm executed by the source computer. We describe an insertion update. A deletion update is performed in a similar matter. The process begins in function block 901 where the skip list S is searched to determine the path P to nodes v and u between which the new element x should be inserted. A processing loop is entered at function block 902 where a new node w is created. Then, in function block 903, the pointers for v and u are updated to reference w between them. Successor and predecessor pointers for node w is set to reference nodes v and u, respectively, in function block 904. In addition, the hash value for the new node w is computed. A random bit b is generated in function block 905, and then a determination is made in decision block 906 whether b is zero. If not, the process loops back to function block 902; otherwise, the remainder of the path P is traversed in function block 907, re-computing hash values for each node in the path. Finally, in function block 908, the basis (A, t) is signed, where A is the hash value of the start node of S and t is a current time stamp.

Figure 10:
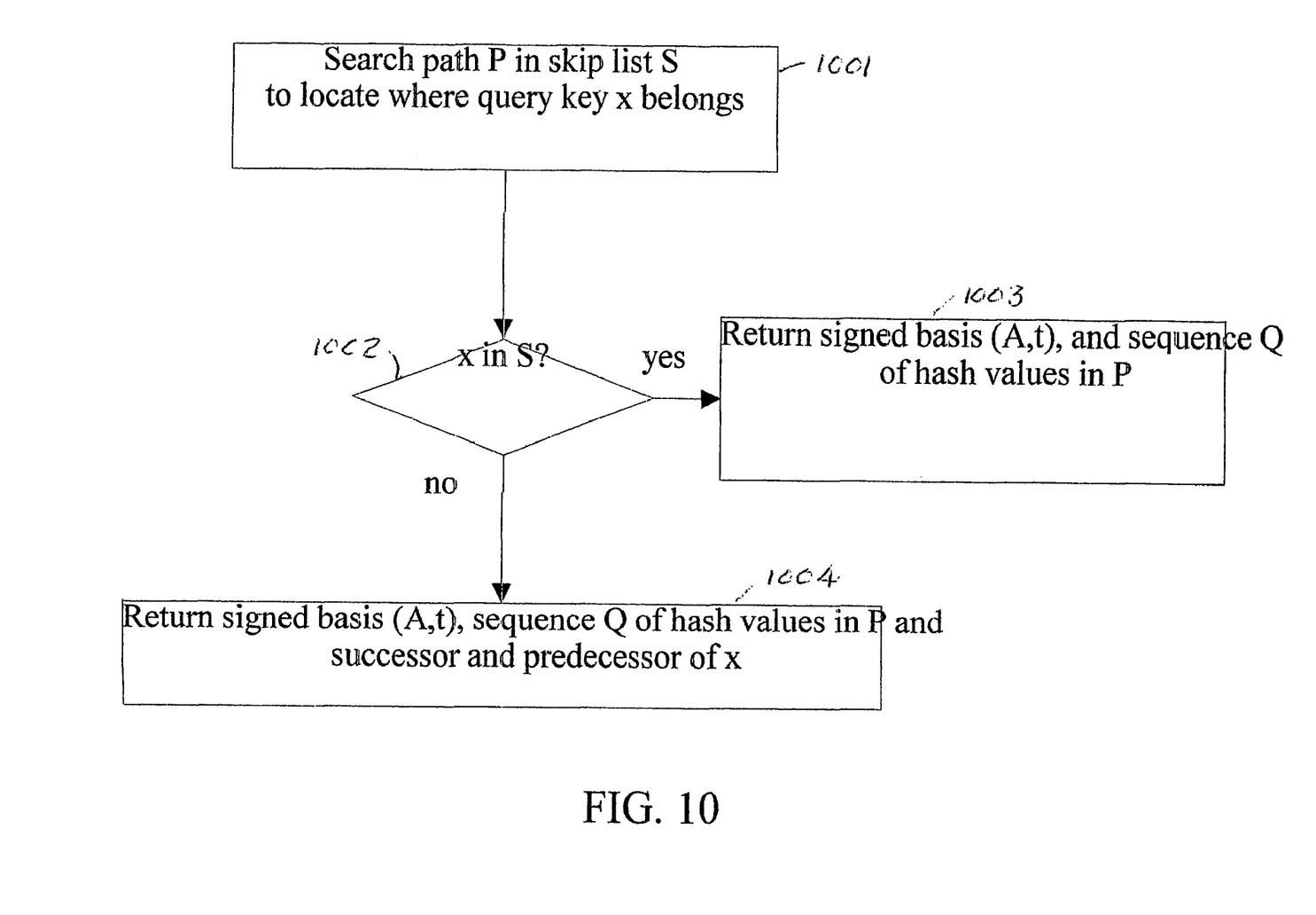
FIG. 10 is a flow diagram showing the logic of the query algorithm executed by the directory computer.

FIG. 10 shows the logic of the query algorithm executed by a directory. The process begins in function block 1001 where the path P in skip list S is searched to locate where query key x belongs. A determination is made in decision block 1002 as to whether x is in S. If so, signed basis (A, t) and sequence Q of hash values in P are returned in function block 1003; otherwise, (A, t) and sequence Q of hash values in P and values stored at the successor and precessor of x in function block 1004.

Figure 11:
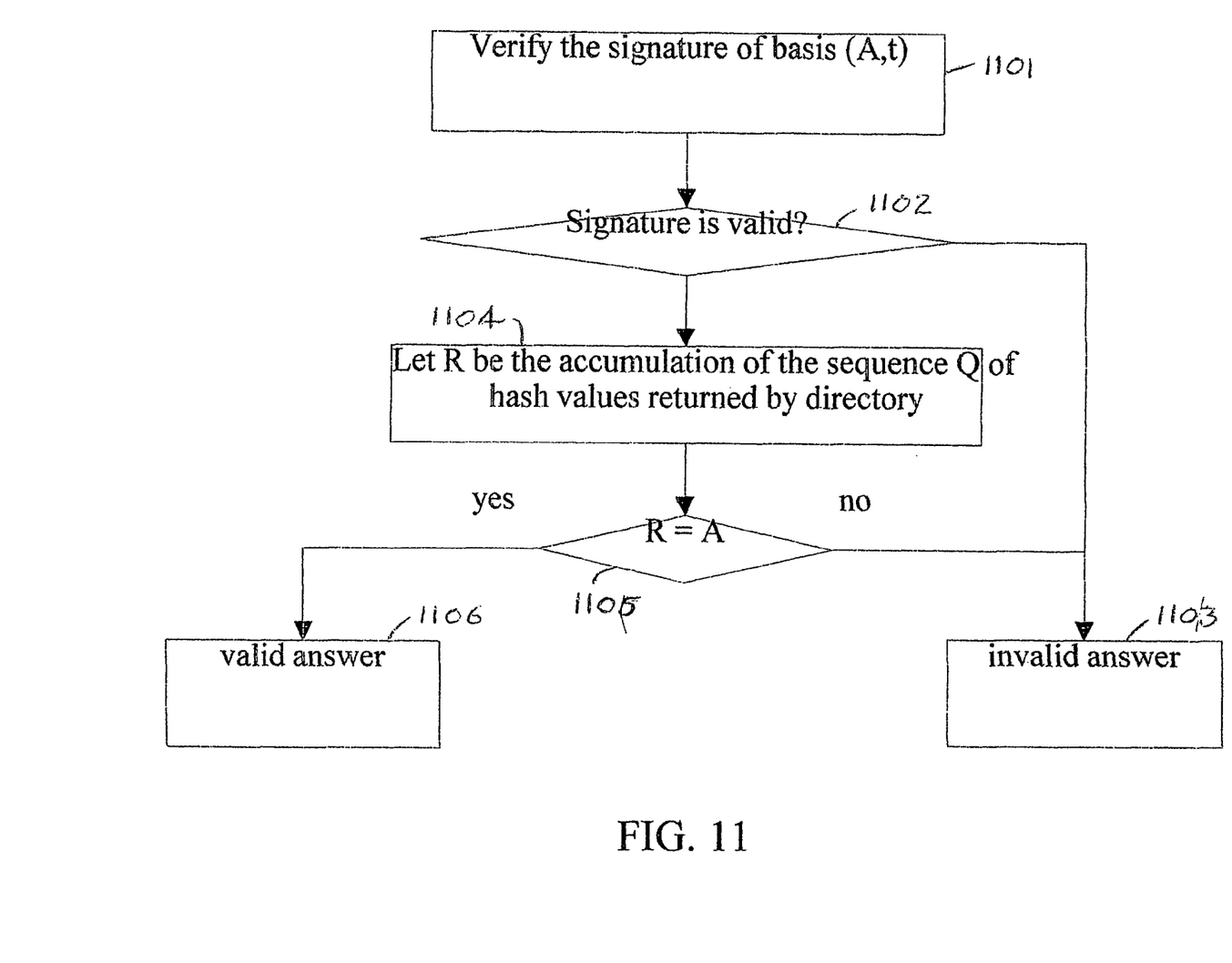
FIG. 11 is a flow diagram showing the logic of the validation algorithm executed by the user.
Figure 12:
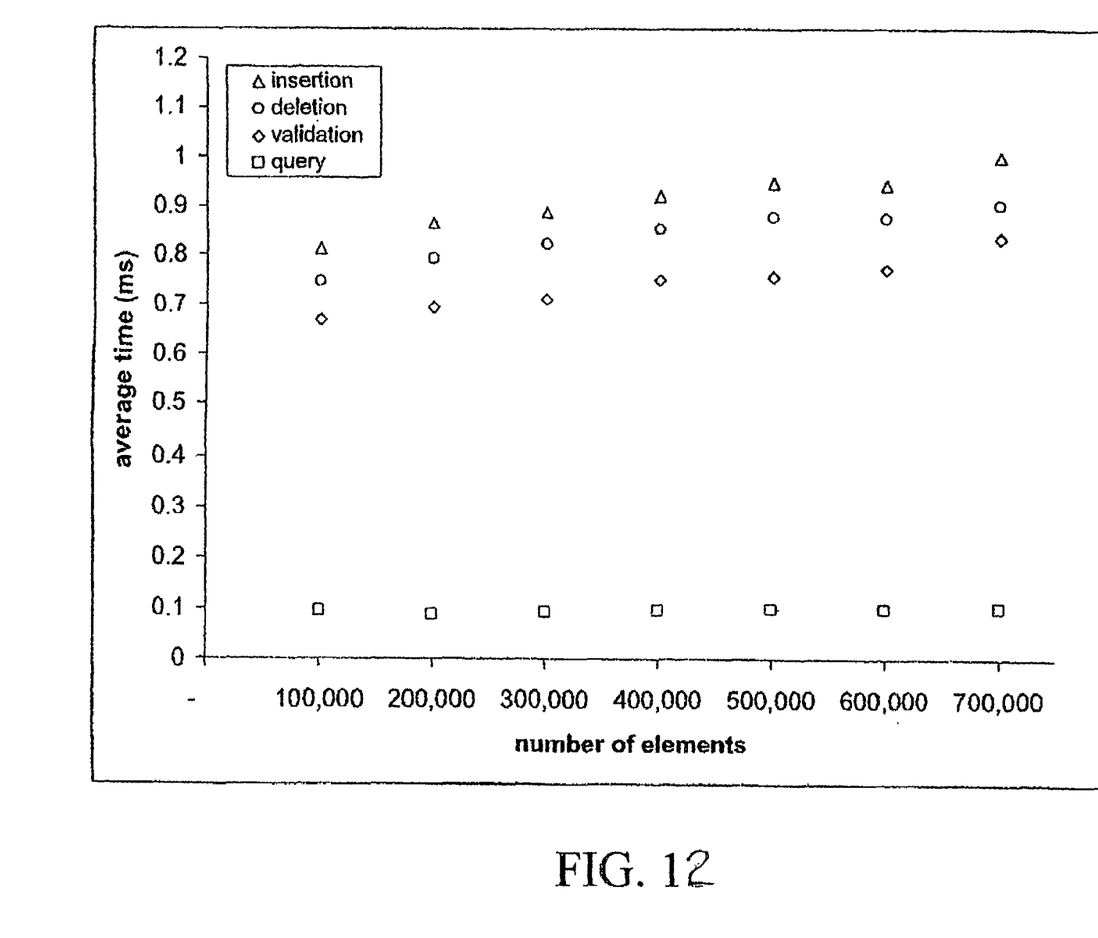
FIG. 12 is a plot of experimental results showing the average time per operation (in milliseconds) of a Java implementation of an authenticated dictionary using a skip list.

FIG. 11 shows the logic of the validation algorithm executed by the user. The process begins in function block 1101 where the signature of the basis (A, t) is verified. A determination is made in decision block 1102 as to whether the signature is valid. If not, an invalid answer is returned in function block 1103. If the signature is valid, then in function block 1104, R, the accumulation of the sequence Q of the hash values, is returned by the directory. A determination is made in decision block 1105 as to whether R is equal to A. If so, a valid answer is returned in function block 1106; otherwise, an invalid answer is returned in function block 1103.

We have developed a prototype implementation in Java of an authenticated dictionary based on skip lists. We have conducted a preliminary experiment on the performance of our data structure for authenticated dictionaries on randomly generated sets of 128-bit integers ranging in size from 100,000 to 700,000. For each operation, the average was computed over 30,000 trials.

The experiment was conducted on a 440 MHz Sun Ultra 10 with 256M of memory running Solaris. The Java Virtual Machine was launched with a 200M maximum heap size. Cryptographic hashing was performed using the standard Java implementation of the MD5 algorithm. The signing of the hash of the start node by the source and the signature verification by the user were omitted from the experiment. The highest level of a tower was limited to 20.

The results of the experiment are summarized in FIG. 14. Note that validations, insertions and deletions take less than 1 ms, while queries take less than 0.1 ms. Thus, we feel the use of skip lists and commutative hashing is a practical scalable solution for the authenticated dictionary.

We have presented an efficient and practical technique for realizing an authenticated dictionary. Our methods achieve asymptotic performance bounds that match those of previous schemes, but do so using simpler algorithms. We are able to retain the basic security properties of the previous schemes but make the dynamic maintenance of an accumulated dictionary more practical, particularly for contexts where user computations must be performed on simple devices, such as PDAs, smart cards, or cellphones.

While the invention has been described in terms of a preferred embodiment, those skilled in the art will recognize that the invention can be practiced with modification within the spirit and scope of the appended claims.

The invention claimed is:

1. A computer implemented method for dynamically maintaining an authenticated dictionary comprising:
   providing a skip list structure of nodes, each of said nodes having an object value associated with a dictionary object;
   maintaining an authentication dictionary by generating, for each node of the skip list structure, a node hash value based on applying a commutative hash function to the object value of the node and to at least one of its linked nodes, the commutative hash function being such that applying said function to sequences of nodes traversed in a skip list rule search of the skip list generates a hash value equal to applying the commutative hash function to the entire skip list;
   generating a signed skip list digest, based on applying the commutative hash function to the entire skip list and signing the resulting hash value;
   authenticating objects as belonging or not belonging to the authentication dictionary by searching the skip list for the object and generating a sequence of the node hash values associated with the path of the nodes traversed by the search; and
   validating said authenticating by generating a validation hash value by applying the commutative hash function to said sequence of hash values and comparing the validation hash value to the signed skip list digest.

2. The method of claim 1, wherein said maintaining includes updating said skip list by inserting another node, and applying said commutative hash function to the updated skip list to generate an updated node hash value for each node.

3. The method of claim 1, wherein said maintaining includes updating said skip list by deleting at least one of said nodes, and applying said commutative hash function to the updated skip list to generate an updated node hash value for each node.

4. The method of claim 1, further comprising:
   maintaining a plurality of directories, each directory having a substantial copy of the authentication dictionary;
   authenticating said directories by carrying out, for objects in the directories, said authenticating of whether the objects are belonging or not belonging to the authentication dictionary, and carrying out said validating of said authenticating.

5. The method of claim 4, further comprising providing a source computer accessible through a network, and at least one user-accessible computer having access to the source computer through the network,
   wherein at least one of the directories is maintained by at least one the user-accessible computers, and
   wherein said maintaining an authentication dictionary is carried out on the source computer.

6. The method of claim 5, further comprising providing a user query of whether an object is an object of at least one of said directories.

7. The method of claim 6, further comprising:
   maintaining at least one authenticated directory by generating, for each node of the skip list of at least one of the directories, a node hash value based on applying a commutative hash function to the object value of the node and to at least one of its linked nodes, the commutative hash function being such that applying said function to sequences of nodes traversed in a skip list rule search of the directory's skip list generates a hash value equal to applying the commutative hash function to the directory's entire skip list;
   generating a directory signed skip list digest, based on applying the commutative hash function to the directory's entire skip list and signing the resulting hash value;
   authenticating objects as belonging or not belonging to the authenticated directory by searching the directory's skip list for the object and generating a sequence of the node hash values associated with the path of the nodes traversed by the search; and
   validating said authenticating by generating a validation hash value by applying the commutative hash function to said sequence of hash values and comparing the validation hash value to the directory signed skip list digest.

* * * * *